(12) United States Patent
Tanaka

(10) Patent No.: US 7,475,864 B2
(45) Date of Patent: Jan. 13, 2009

(54) DEFLATION VALVE FOR COMPRESSION BAG AND COMPRESSION BAG EQUIPPED WITH THE DEFLATION VALVE

(75) Inventor: Kazuya Tanaka, Kashihara (JP)

(73) Assignees: Osamu Kawai, Nara (JP); Compac Japan Ltd., Nara (JP)

(*) Notice: Subject to any disclaimer, the term of this patent is extended or adjusted under 35 U.S.C. 154(b) by 422 days.

(21) Appl. No.: 11/443,209

(22) Filed: May 31, 2006

(65) Prior Publication Data
US 2007/0068841 A1 Mar. 29, 2007

Related U.S. Application Data

(63) Continuation-in-part of application No. PCT/JP2005/017804, filed on Sep. 28, 2005.

(51) Int. Cl.
*F16K 31/44* (2006.01)
(52) U.S. Cl. .................... 251/82; 206/524.8
(58) Field of Classification Search .............. 251/77, 251/82, 331; 206/524.8
See application file for complete search history.

(56) References Cited

U.S. PATENT DOCUMENTS

| 3,807,445 | A | * | 4/1974 | McPhee .................. 137/557 |
| 6,089,271 | A | * | 7/2000 | Tani ........................ 137/854 |
| 6,712,334 | B2 | * | 3/2004 | Motonaka et al. ........ 251/149.6 |
| 7,055,794 | B1 | * | 6/2006 | Tang ........................ 251/82 |
| 2004/0232368 | A1 | | 11/2004 | Motonaka et al. |

FOREIGN PATENT DOCUMENTS

| JP | 5-44837 U | 6/1993 |
| JP | 2004-338784 A | 12/2004 |

* cited by examiner

*Primary Examiner*—John K Fristoe, Jr.
(74) *Attorney, Agent, or Firm*—Birch, Stewart, Kolasch & Birch, LLP

(57) ABSTRACT

A deflation valve for a compression bag comprising a base 2, a cover 3, and a valve body 4, the base 2 serving as a deflation opening 22 that communicates the inside and outside of the bag, the cover being provided with a through hole 32 that leads to the inside of the cover, the valve body 4 being able to close the deflation hole 22 by being drawn toward the hole under negative pressure inside the compression bag, wherein a pressing portion 33 is formed underside of the cover 3 in order to press the valve body, and a valve housing chamber S is defined by the sidewall 24 and diaphragm 24 on the base 2 and the lower edge of the pressing portion 33 of the cover 3, while the valve body 4 is neither secured to the base 2 and the cover 3 nor pressed by any elastic member, but is disposed inside the valve hosing chamber S in a free state, whereby the valve body 4 is movable upward and downward in the chamber S.

7 Claims, 16 Drawing Sheets

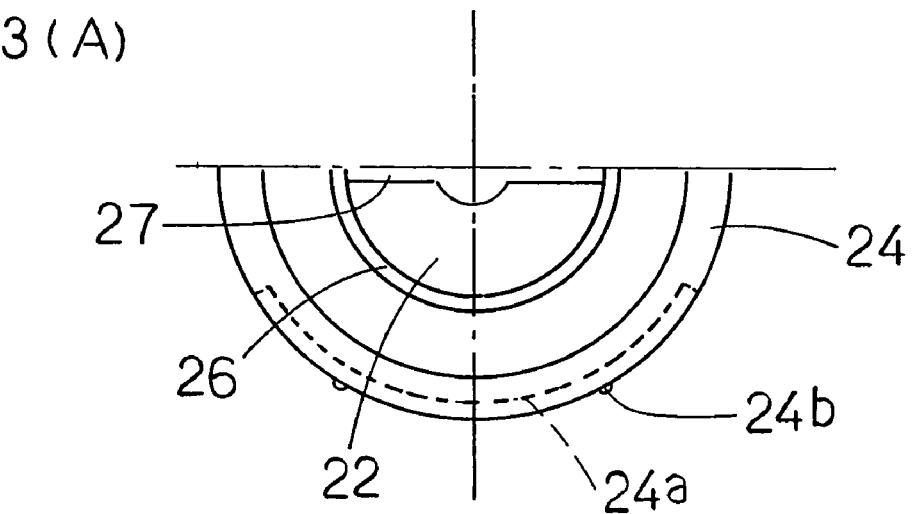
F I G 3(A)
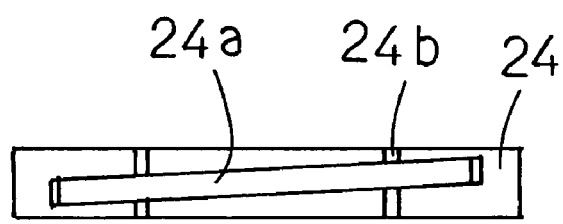
F I G 3(B)

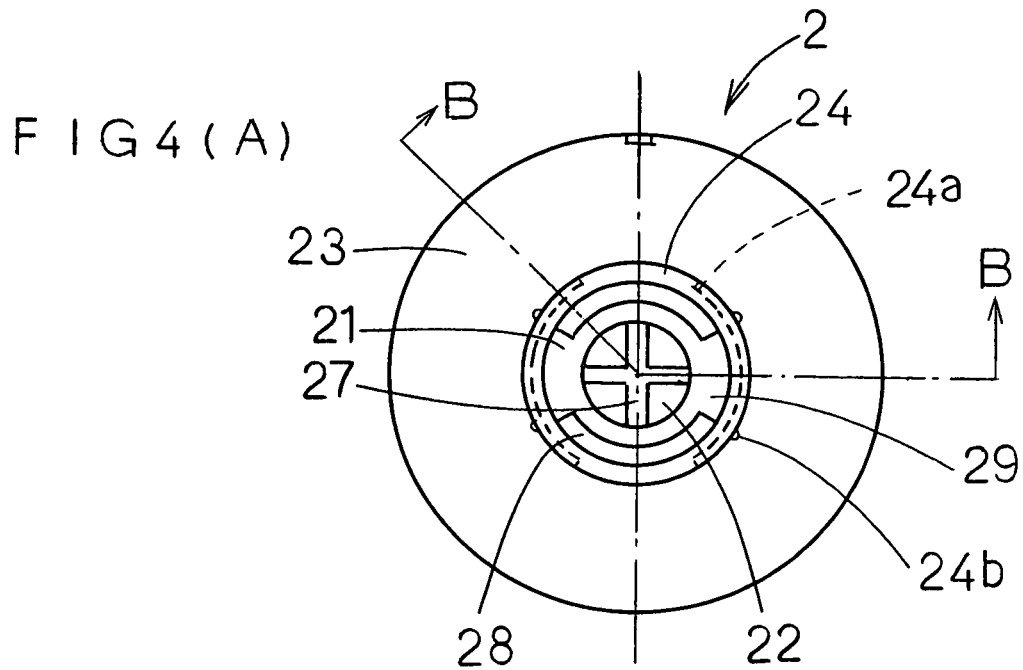
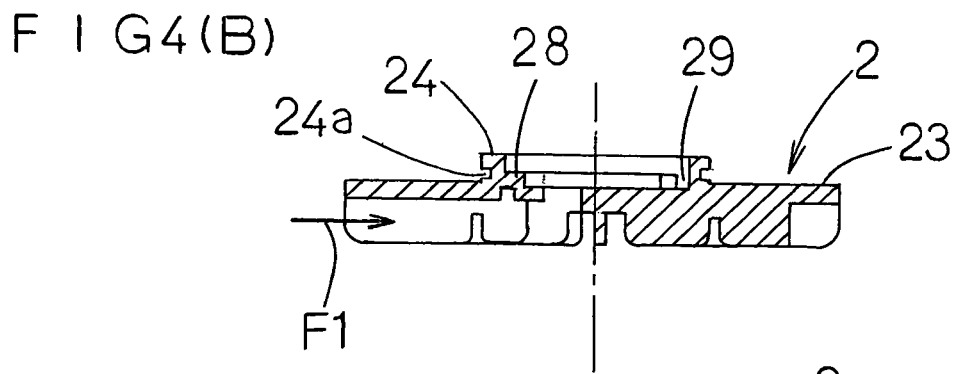
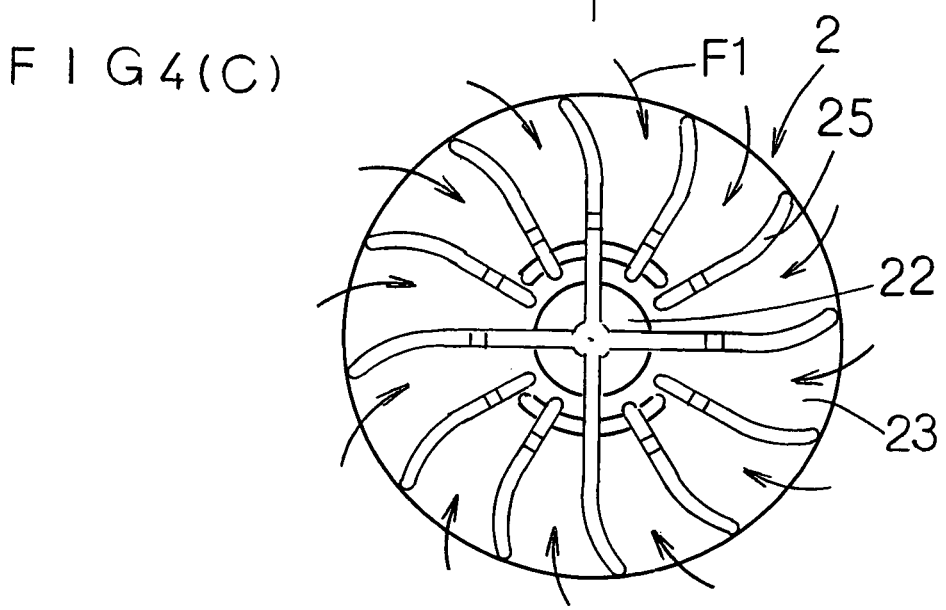

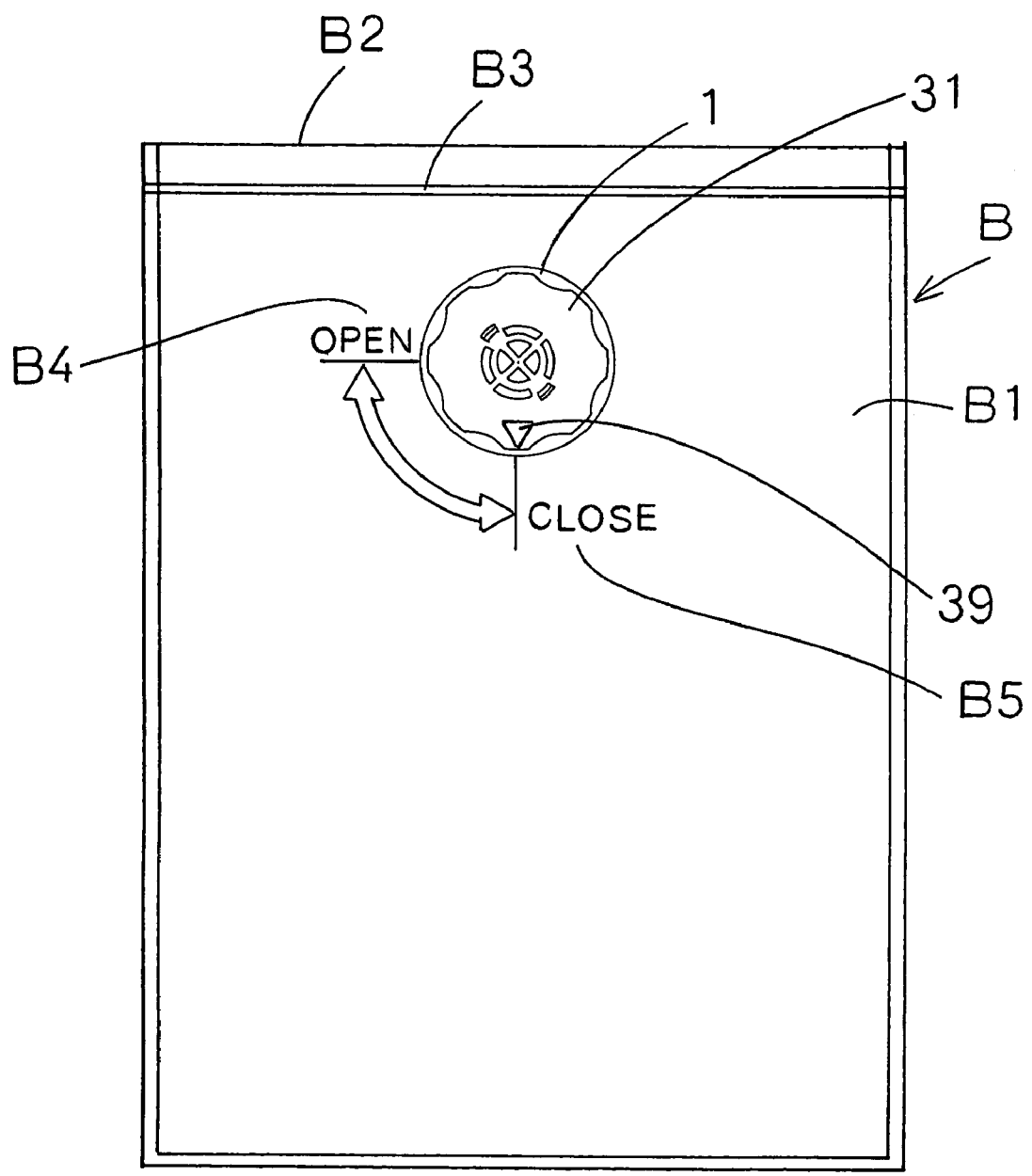

DEFLATION VALVE FOR COMPRESSION BAG AND COMPRESSION BAG EQUIPPED WITH THE DEFLATION VALVE

This application is a Continuation-In-Part of co-pending Application No. PCT/JP2005/017804 filed on Sep. 28, 2005, the entire contents of which are hereby incorporated by reference and for which priority is claimed under 35 U.S.C. § 120.

FIELD OF THE INVENTION

The present invention is related to a deflation valve for a compression bag that discharges air inside the bag, and a compression bag equipped with the deflation valve.

BACKGROUND OF THE INVENTION

Patent Reference 1: JP utility model application publication H05-44837.

Conventionally, a compression bag that can store a bulky item such as clothing or bedding containing air there inside is present. Such compression bag is compressed by discharging air in the bag, then storing the item in a compact state.

The item to be stored is placed into and taken out of the compression bag, which is comprised of an opening provided with a fastener to be able to seal the bag airtight. In addition to this, many types of compression bag have a deflation valve that includes an airflow path for discharging air inside the bag.

A compression bag like this is connected with a vacuum cleaner at a deflation valve of the bag in order for the vacuum cleaner to draw and discharge air inside the bag.

An example of deflation valve is a deflation valve for storage bag in the above-mentioned referential document, which is comprised of a base integrally fixed to a compression bag to communicate the inside and outside of the bag through an airflow path, and a cover arranged so as to engage onto the base.

The base is formed with a valve body, which is provided with a rubber packing and can open the airflow path formed on the cover when the cover is loosened from the base.

Specifically, as described above, the airflow path is opened only when a vacuum cleaner being connected with the bag draws air inside the bag to the outside, while the valve body is applied to a pressing device such as a spring so as to close the airflow path.

Then, the valve body is put in a closed state by engaging the cover onto the base and the compression bag keeps a deflated state inside thereof.

Since the valve body is applied to an elastic force in this conventional deflation valve, it is a problem that the valve fails to achieve a quick deflation because of time difference occurring between drawing of air by the vacuum cleaner and the valve mechanism in response to it. Also, a number of elements such as a pressing device and packing are required.

Considering these problems, the object of the present invention is to provide a deflation valve for a compression bag and a compression bag equipped with a deflation valve of a simple structure. Another object of the present invention is to provide a deflation valve for a compression bag and a compression bag equipped with a deflation valve in which a quick deflation is achieved.

SUMMARY OF THE INVENTION

In order to solve the problems, an aspect of the present invention set forth in claim 1 provides a deflation valve for a compression bag comprising a base 2 that has a set of slots 24a and serves as a deflation opening of a compression bag B after being fixed to a hole provided on the compression bag B, a cover 3 that is attached to the top of the base 2 by engagement into the slots 24a, and a valve body 4 formed separately from the base 2 and the cover 3. The base 2 is formed with a diaphragm 21 that closes the inside of the compression bag B from the outside thereof. The diaphragm 21 is provided with a deflation hole 22 that communicates the inside and outside of the compression bag B. The cover 3 has a contact portion 31a on its upper surface to be contacted with a suction port N of vacuum cleaner as a vacuum source. The contact portion 31a is provided with a through hole in the area the suction nozzle N contacts and encircles. The through hole leads to the inside of the cover 3. The valve body 4 is disposed in a valve housing chamber S enclosed by the diaphragm 21 of the base 2 and the cover 3. The valve body 4 is able to close the deflation 22 from the upper side by being drawn toward the hole under negative pressure inside the compression bag B and movable away from the deflation hole 22 by suction of the vacuum source when the cover 3 is loosened and moves up, then keeps the deflation hole 22 sealed when the cover 3 is tightened and moves down. A set of the slots 24a are provided on a sidewall 24 that is formed in a manner to protrude upward on the base 2. A pressing portion 33 is formed on the underside of the cover 3 in order to press the valve body 4 with the engagement of the cover 3. The valve housing chamber S is defined by the sidewall 24, the diaphragm 21, and the lower edge of the pressing portion 33 of the cover 3. The valve body 4 is neither secured to the base 2 and the cover 3 nor pressed by any elastic member, but is disposed inside the valve housing chamber S in a free state. The valve body 4 is movable upward and downward inside the valve housing chamber S when the cover 3 is loosened, and can entirely overlay the deflation hole 22 despite the horizontal movement of the valve body 4.

An aspect of the present invention set forth in claim 2 provides the deflation valve for a compression bag as set forth in claim 1, wherein the vertical dimension of the valve housing chamber S is formed at least smaller than the minimum dimensions crossing the center of the valve body 4 in the horizontal direction when the cover 3 is loosened.

An aspect of the present invention set forth in claim 3 provides the deflation valve for a compression bag as set forth in claim 1 2, wherein the valve is comprised of at most the base 2, the cover 3, and the valve body 4.

An aspect of the present invention set forth in claim 4 provides the deflation valve for a compression bag as set forth in claim 1 or 2, wherein airflow interference wall 37 that protrudes from the underside of the cover 3 is provided outside the through hole 32 as well as outside the sidewall 24 of the base 2 with the cover 3 attached to the base 2 in a top view.

An aspect of the present invention set forth in claim 5 provides the deflation valve for a compression bag as set for in claim 1 or 2, wherein the pressing portion 33 of the cover is configured such that a pressing ring 33a in which an upper edge surface 33a1 is positioned lower than the upper surface 31 of the cover 3 is provided. And, the through hole 32 is comprised of a center hole 32a provided in the pressing ring 33a and circumferential holes 32b provided outside the pressing ring 33a in a top view, and the center hole 32a and circumferential holes 32b are positioned lower than the upper surface 31 of the cover 3. A flight of space 32c that stretches above the pressing ring 33a is further provided.

An aspect of the present invention set forth in claim 6 provides the deflation valve for a compression bag as set forth in claim 5, wherein the valve body 4 includes a protrusion 41 jutting out upward, the pressing ring 33a of the cover 3 is provided with a valve support portion 33b, wherein the projection 41 is arranged so as to be movable upward and downward through the valve support portion 33b.

An aspect of the present invention set forth in claim 7 provides a compression bag that has a sealable space there inside by adhering soft resin bag sheets B1, wherein the bag sheet B1 is equipped with a deflation valve 1 for a compression bag in any of claims 1 to 6, and air in the space is drawn out of the bag through the deflation hole 22, whereby the deflated state can be kept.

BRIEF DESCRIPTION OF THE DRAWINGS

FIG. 3(A) is an enlarged plan view showing the principal part of the sidewall of the base of deflation valve in an embodiment, and FIG. 3(B) is an enlarged side view showing the same.

FIG. 4(A) is a plan view showing another embodiment of the base of deflation valve, FIG. 4(B) being a cross sectional view taken at cut line B-B in FIG. 4(A), and FIG. 4(C) being a bottom view showing the embodiment.

FIG. 16 is a plane view showing a compression bag with a deflation valve according to the present invention.

DETAILED DESCRIPTION OF THE INVENTION

Figure 1:
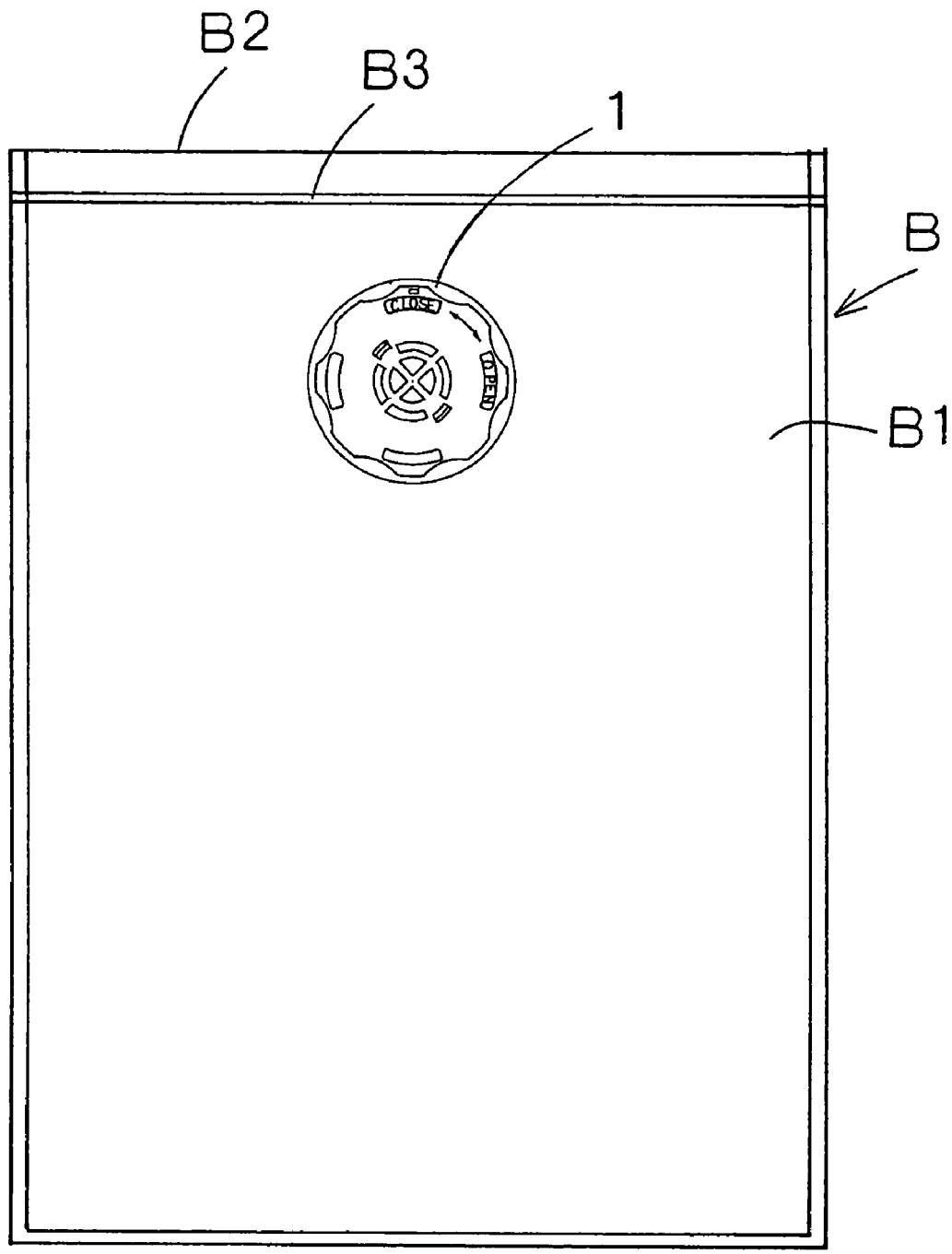
FIG. 1 is a plane view showing an embodiment of a compression bag with a deflation valve in this invention.

In the following, an example of a preferred embodiment of the present invention will be described referring to the drawings.

As shown in figures such as FIGS. 2(A) to 2(C) and 5(A) to 5(C), a deflation valve 1 for a compression bag in this embodiment is comprised of a base 2 and a cover 3, each of which are formed separately, and a valve body 4. Compared to a conventional deflation valve, the valve in this invention requires fewer elements, and its structure is relatively simple. As shown in FIG. 1, this deflation valve 1 is used after being attached to a compression bag B made of soft resin bag sheets B1 adhered together, and the inside of the bag is formed as a hermetically closable space. With the deflation valve 1 disposed in the horizontal direction shown in FIG. 12(B), the outward direction of the compression bag B is referred as "upper" while the inward direction thereof as "under" in respect of with positional expressions.

Figure 2A:
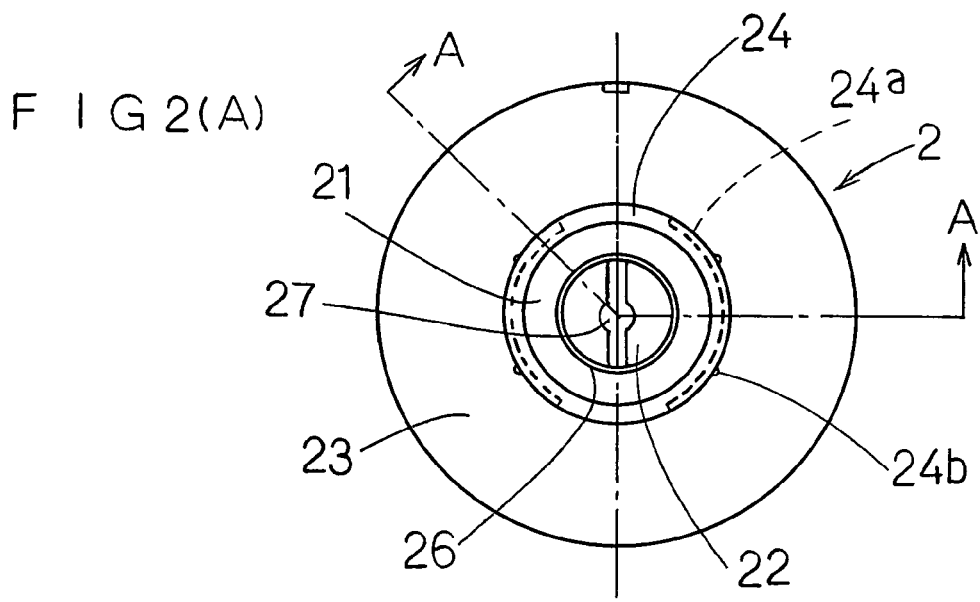
FIG. 2(A) is a plane view showing an embodiment of the base of deflation valve in this invention, FIG. 2(B) being a cross sectional view taken at cut line A-A in FIG. 2(A), and FIG. 2(C) being a bottom view showing the embodiment.
Figure 2B:
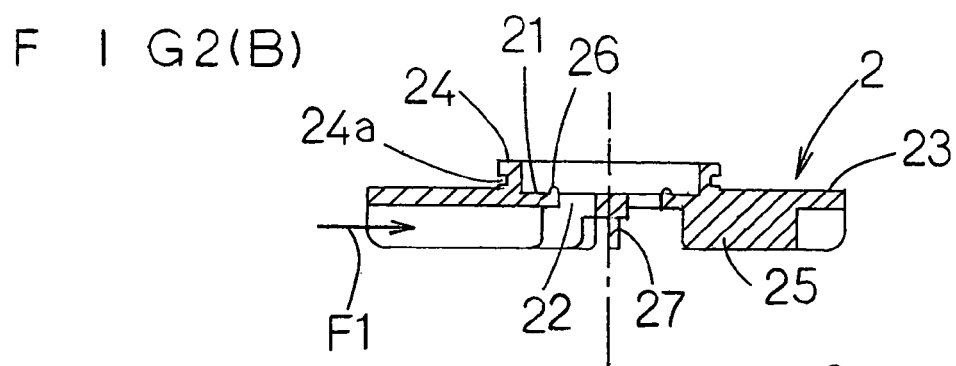
Figure 2C:
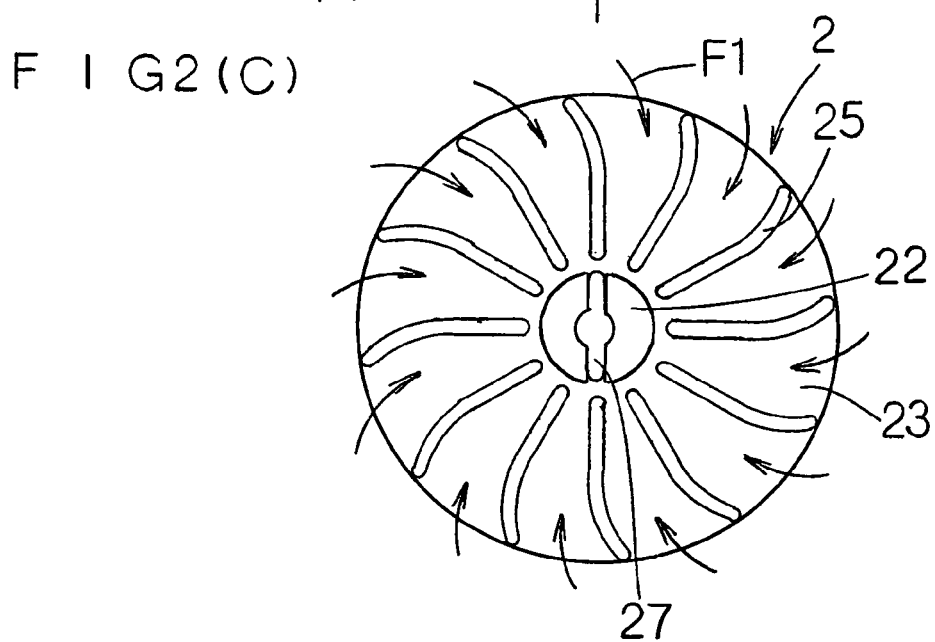

A base 2 shown in FIGS. 2(A) to 2(C) serves as a deflation opening of a compression bag B after being fixed to a hole (not shown in figures) provided in advance on the compression bag B as shown in FIG. 1.

The base 2 has a flat attachment plate 23. In this embodiment, this attachment plate 23 is circular, but not limited to this shape, and can be, for example, elliptical or polygonal.

Figure 12A:
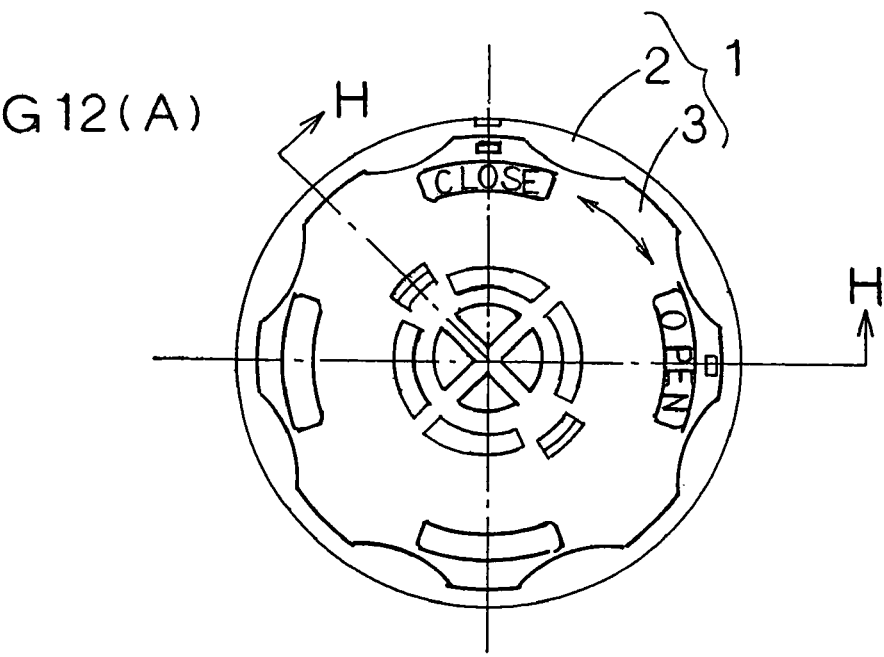
FIG. 12(A) is a plan view showing a closed state of deflation valve in an embodiment, FIG. 12(B) being a cross sectional view taken at cut line H-H in FIG. 12(A), and FIG. 12(C) being an enlarged cross sectional view taken at cut line I-I in FIG. 12(B).
Figure 12B:
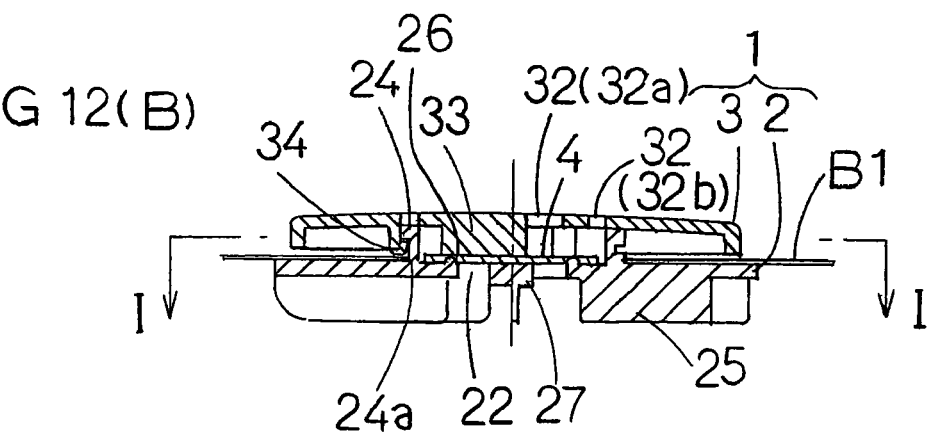
Figure 13A:
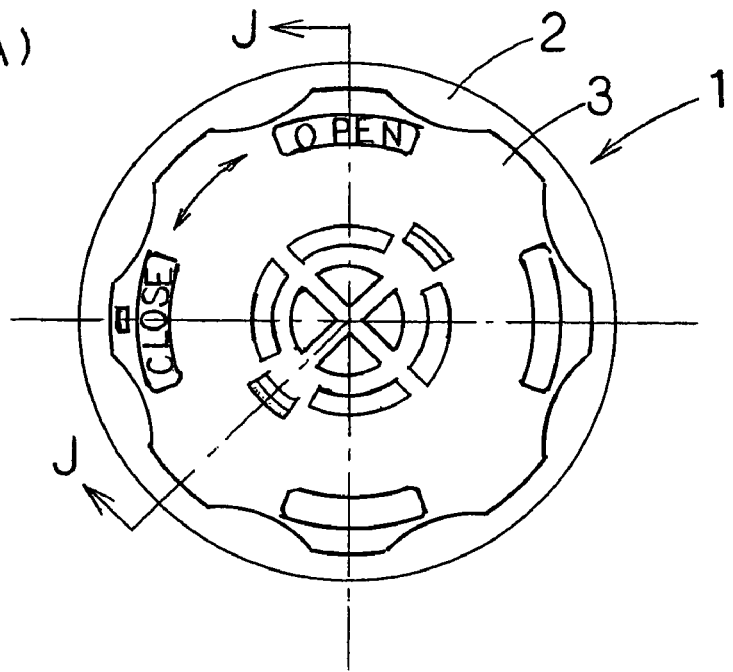
FIG. 13(A) is a plan view showing an opened state of deflation valve in an embodiment.
Figure 13B:
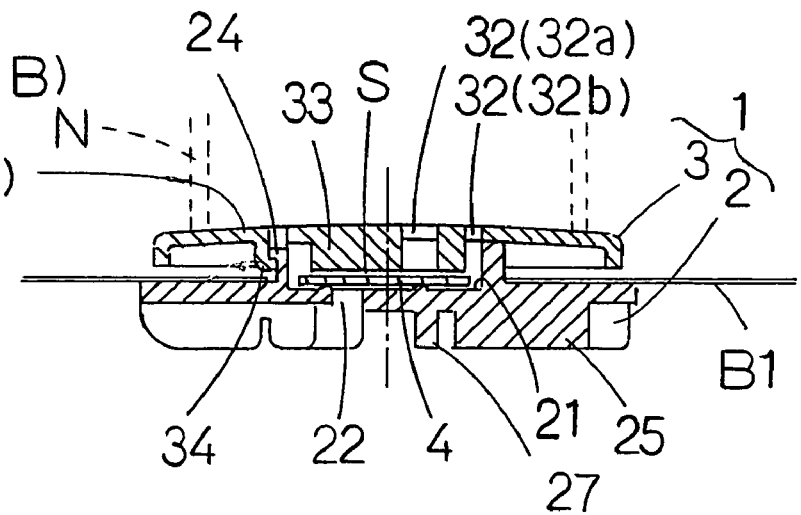
FIG. 13(B) is a cross sectional view taken at cut line J-J in FIG. 13(A).
Figure 14A:
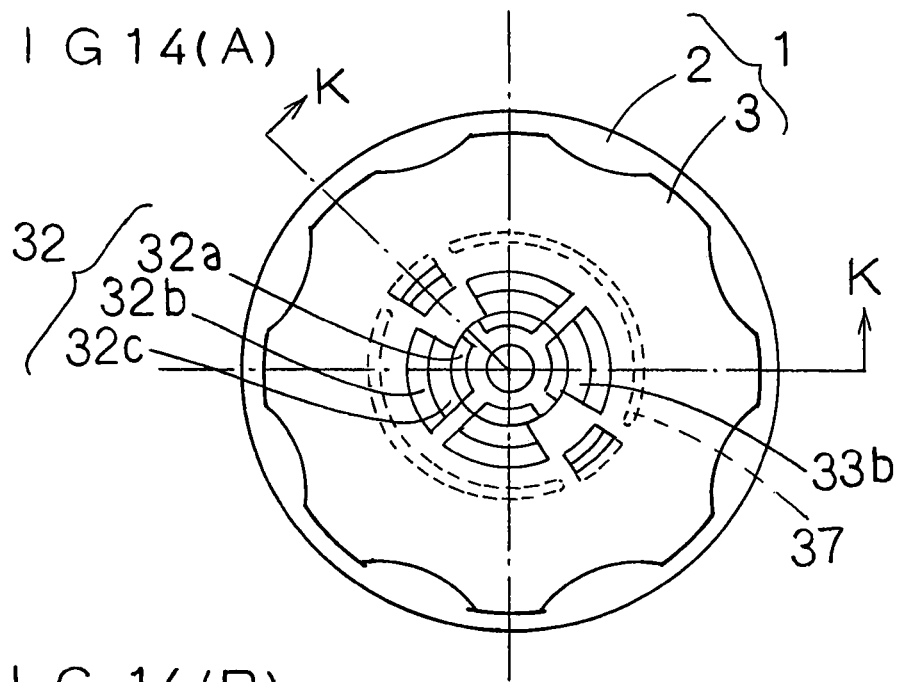
FIG. 14(A) is a plan view showing a closed state of deflation valve in another embodiment.
Figure 14B:
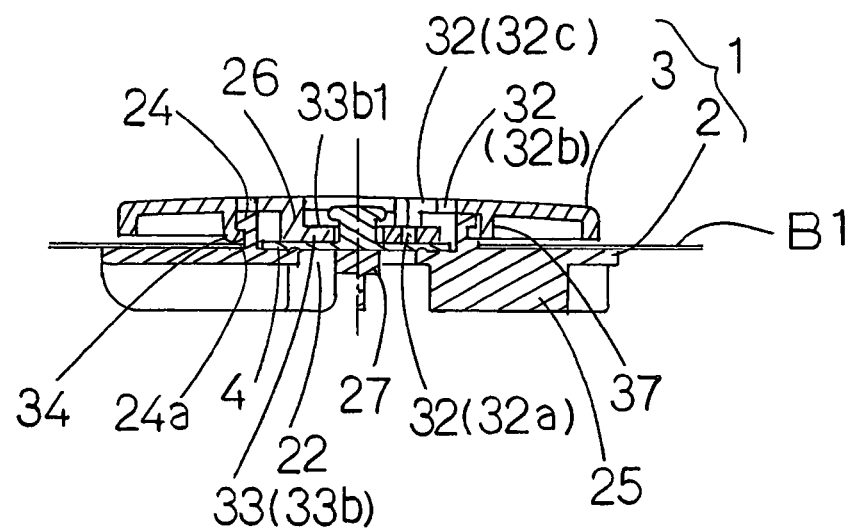
FIG. 14(B) is a cross sectional view taken at cut line K-K in FIG. 14(A).

As shown in FIGS. 12(B) and 13(B), the upper surface of this attachment plate 23 touches the inner surface of the bag sheet B1, and part of the upper surface is adhered to the sheet B1 after the compression bag B.

On the attachment plate 23 is provided sidewall 24 that protrudes upward as shown in FIGS. 2(A) and 2(B). In this embodiment, the sidewall is substantially cylindrical. When the base 2 is fixed to the compression bag B, the sidewall 24 goes into the hole on the bag sheet B1, then the periphery of the hole and the attachment plate 23 are adhered airtight together.

Figure 12C:
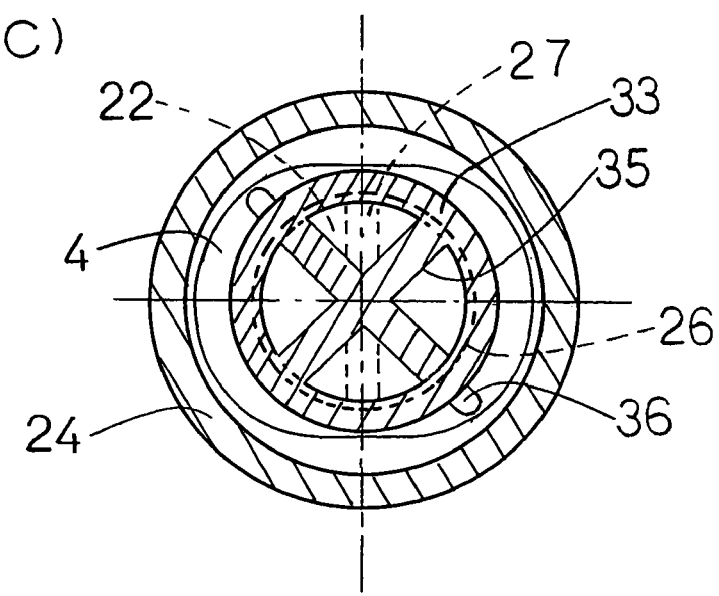

As shown in FIGS. 2(B), 3(A) and 3(B), the sidewall 24 has a set of slots 24a on the outer peripheral surface in this embodiment. It is not limited to the outer peripheral surface of the sidewall, however, the slots 24a may be provided only on the inner peripheral surface or on both the inner and outer peripheral surfaces. The slots 24a in this embodiment are formed as engaging grooves 24a that slant in the horizontal direction. As shown in FIG. 5(B), a pair of hooks 34 provided on the cover 3 have an end portion 34a respectively for engagement into the grooves 24a to integrate the cover 3 with the base 2 illustrated in FIGS. 12 and 13.

In this embodiment, a single slot 24a is provided per 180° with respect to the center of the attachment plate 23 in a top view, as shown in FIG. 2(A). Each of the slots 24a is formed so that the cover 3 can rotationally move 90° by adding an area of the same size as a later-described end portion 34a of the hook 34 adjacent to both ends of the 90° respectively to correspond to the end portion 34a viewed from the top. Furthermore, as shown in FIGS. 3(A) and 3(B), on the outer peripheral surface of the. sidewall 24 are provided click protrusions 24b in a manner to sandwich the slot 24a. A pair of the click protrusions 24b are positioned to correspond to where the cover 3 is loosened (opened position) furthest from the base 2, while the other pair positioned to where the cover 3 is engaged tightest (closed position) onto the base 2. The click protrusions 24b secure the cover 3 at the opened position and at the closed position after corresponding end hook 34a of the cover 3 move over respective pair of the click protrusions 24b. In addition, recessed portions where the click protrusions 24b fit may be formed on the inner surface of the end hook 34a to secure the cover 3 by fitting the recessed portions and click protrusions together. Also, inside the slots 24a may be provided the click protrusions 24b.

In this embodiment the base 2 is formed with the slots 24a as concavity, while the cover 3 is formed with the hooks 34 as convexity. Contrary to this, convexity on the base 2 as well as concavity on the cover 3 may be applied.

The inner side where the sidewall 24 on the attachment plate 23 encircles is a diaphragm 21, which is combined with the valve body 4 so as to close the inside of the compression bag B from the outside thereof. Although the surface on the upper surface of the diaphragm 21 is flat in this embodiment, it may be made curved like a bowl. The diaphragm 21 is provided with a deflation hole 22 that communicates the inside and outside of the compression bag B. As described above, since the attachment plate 23 of the base 2 is adhered airtight to the bag sheet B1, air passes only through this deflation hole 22 in the deflation valve 1.

As shown in FIGS. 2(A) and 2(C), the deflation hole 22 in this embodiment is a circular hole viewed from the top, disposed at the center of the attachment plate 23 and the diaphragm 21. On the underside of the attachment plate 23 are formed radial stream vanes 25. A linear valve support member 27 is provided on an inward extension of part of the stream vanes 25 in a manner to cross the hole. With respect to the center of the circular hole, the valve support member 27 divides the hole into two for 180° each in a top view, and supports the valve body 4 from underneath. The shape of the deflation hole 22 is not limited to this embodiment. For example, as shown in FIGS. 4(A) and 4(C), the valve support member 27 may divide the hole into four for 90° each in a top view. Further, a plurality of holes with short diameter or slit-type holes extending in a radial or in a circumferential direction may be applied to modify the embodiment into various shapes.

On the upper surface of the diaphragm 21 is formed a convex rib 26, which protrudes upward in a manner to encircle the deflation hole 22. The rib 26 in the configuration of 1 mm broad and 0.3 mm high in this embodiment is fully provided in a circumferential direction right along the outside of the deflation hole 22. When a pressing portion 33 presses the valve body 4 from the top, the rib 26 presses the same from underneath illustrated in FIG. 12(B), thereby securely closing the deflation hole 22 by the valve body 4. As shown in FIGS. 4(A) and 4(B), the rib 26 may be omitted, though.

As mentioned above and shown in FIG. 2(C), on the underside of the attachment plate 23 are provided stream vanes 25, which radiate from the center of the attachment plate 23 and curve in a circumferential direction as they go further from the center. As illustrated, the stream vanes in this embodiment radiate straight before gradually curving in a circumferential direction.

With such stream vanes 25 provided on the underside of the attachment plate 23, as shown in FIGS. 2(B) and 2(C), airflow F1 of air to be drawn out of the compression bag 1 and flowing on the attachment plate 23 is directed to the deflation hole 22 swirling along the stream vanes 25. This causes relatively less resistance to draw air in the bag. Further, the stream vanes 25 prevent the deflation hole 22 from being clogged by the bag sheet B1 placed behind the deflation valve 1 or a stored item that is drawn near the hole.

Figure 5A:
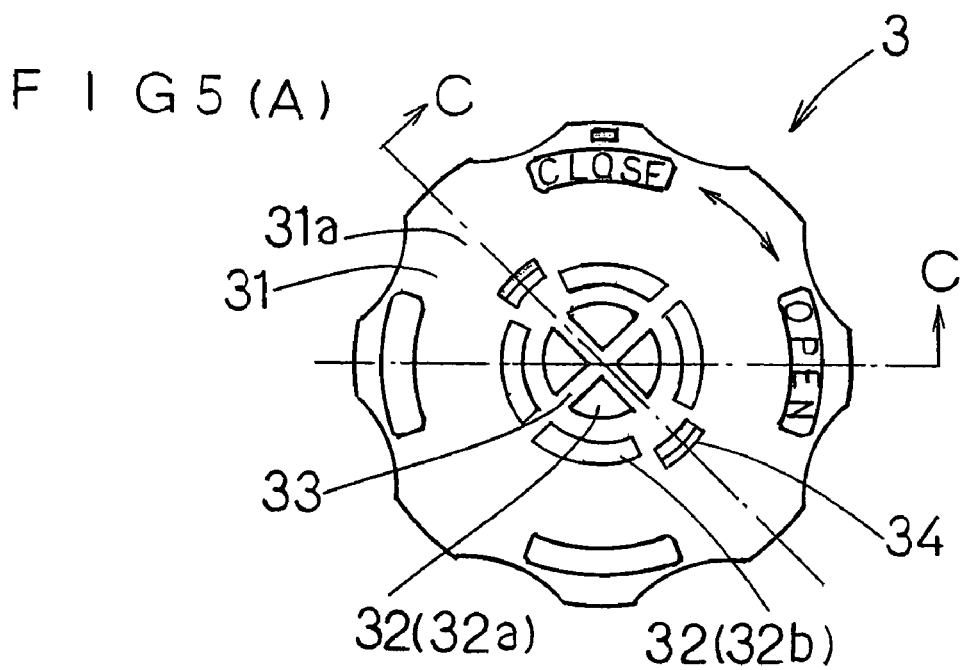
FIG. 5(A) is a plan view showing an embodiment of the cover of deflation valve in this invention, FIG. 5(B) being a cross sectional view taken at cut line C-C in FIG. 5(A), and FIG. 5(C) being a bottom view of the embodiment.
Figure 5B:
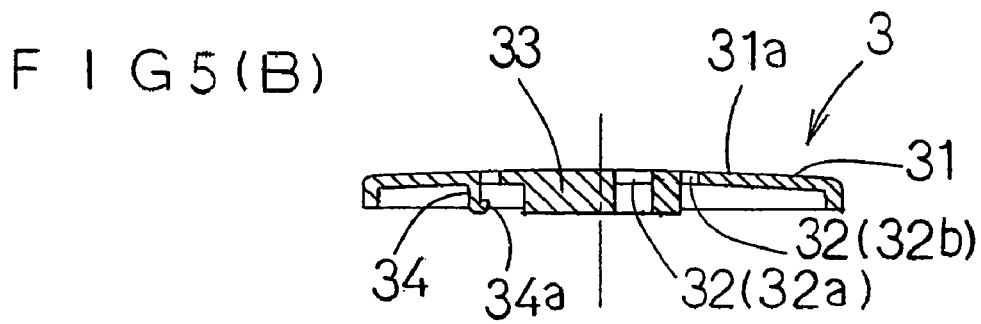
Figure 5C:
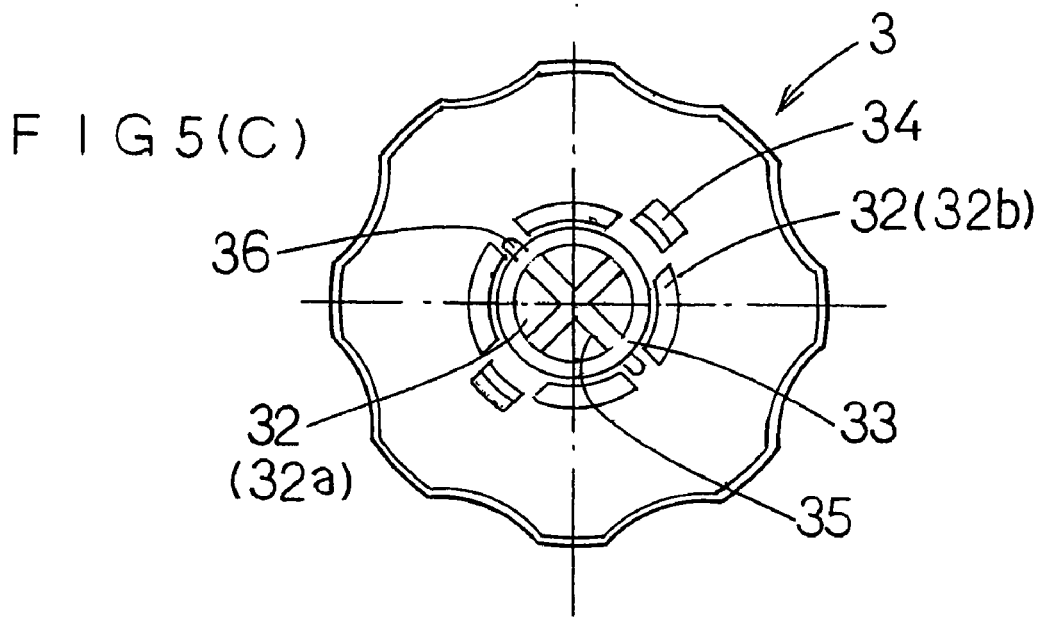

Referring to FIGS. 5(A) to 5(C), the cover 3 is described hereupon. An upper surface 31 of the cover 3 is made flat or slightly curved, part of which is a contact portion 31a where a suction nozzle N of vacuum cleaner as a vacuum source contacts. In the area the suction nozzle N encircles in contacting the contact portion 31a is provided a through hole 32 on the cover side, which penetrates in the vertical direction. This through hole 32 is comprised of a center hole 32a formed in the middle of the contact portion 31a in almost the same size as the deflation hole 22 of the base 2 and circumferential holes 32b provided at four locations in a manner to surround the center hole 32a. Airflow passing through the deflation hole 22 of the base 2 is drawn to the outside of the deflation valve 1 by way of this through hole 32. A detailed deflation process will be described later.

On the underside of the cover 3 protrude the hooks 34, as shown in FIGS. 5(B) and 5(C). A single hook 34 in FIG. 5(C) is provided per 180° with respect to the center of the upper surface 31 viewed from underneath.

End of the hook 34 is formed with a claw 34a that faces inward. As described above, the claw 34a engages the engaging groove 24a formed on the outer peripheral surface on the sidewall 24 of the base 2. Consequently, the cover 3 can rotationally move onto the base 2 in loosening and tightening directions in a range the claw 34a moves in the corresponding groove 24a. Since the engaging grooves 24a are formed aslant as shown in FIG. 3(B), the cover 3 moves up and down onto the base 2 as its rotational movement. In the case of the engaging grooves 24a on the base 2 are formed on the inner peripheral surface on the sidewall 24, corresponding hooks 34 are also modified to be able to engage the grooves 24a.

The range the cover 3 rotationally moves onto the base 2 in this embodiment is set to 90°. In other words, the angle the cover 3 engages onto the base 2 is 90° only. Therefore, regarding the deflation valve 1 in this embodiment, it is not necessary to rotationally move the cover again and again for engagement onto the base as in patent reference 1, thereby achieving a simpler operation compared to a conventional practice.

Although a preferable range for the rotational movement of the cover 3 is from 30° to 180°, the cover 3 may go beyond the range and rotate several times.

On the underside of the cover 3 is provided a pair of protrusions 36 for supporting the rotational movement at a position 90° sifted from the hooks 34. As shown in FIG. 5(C), the protrusions 36 in this embodiment are disposed adjacent to the pressing portion 33 on the outer peripheral side. When the cover 3 is attached to the base 2, the protrusions 36 sit farther inside from the inner surface of the sidewall 24 of the base 2 shown in FIG. 12(C), whereby the cover 3 can move rotationally onto the base 2 without wavering.

As shown in FIGS. 5(B) and 5(C), the pressing portion 33 is formed slightly closer to the center than the hook 34 on the underside on the cover 3 in a manner to protrude downward. As the cover 3 goes down by moving rotationally along the engaging grooves 24a, the pressing portion 33 can press at least part of the peripheral edge of the valve body 4 illustrated in FIGS. 12(B) and 12(C). In this embodiment the pressing portion 33 is circular as shown in FIG. 5(C). Also, inside the pressing portion 33 is provided a cross-shaped connecting portion 35, which is positioned to connect four positions per 90° with respect to the center of the upper surface 31 of the cover 3 as shown in FIG. 5(C). However, this connecting portion 35 may be omitted.

Figure 6A:
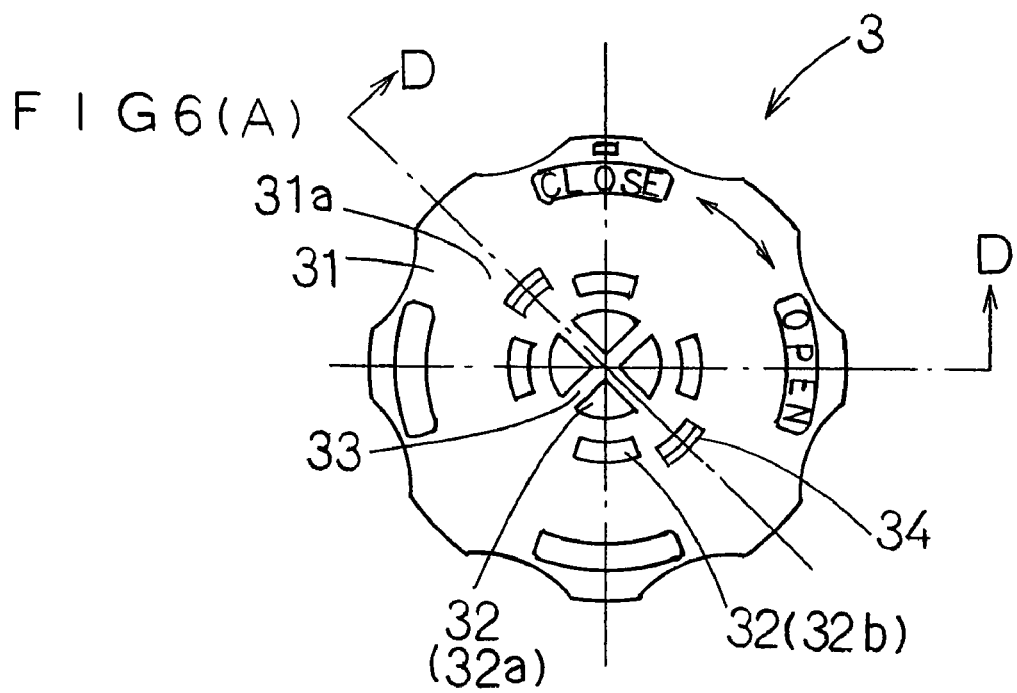
FIG. 6(A) is a plan view showing another embodiment of the cover of deflation valve, FIG. 6(B) being a cross sectional view taken at cut line D-D in FIG. 6(A), and FIG. 6(C) being a bottom view of the embodiment.
Figure 6B:
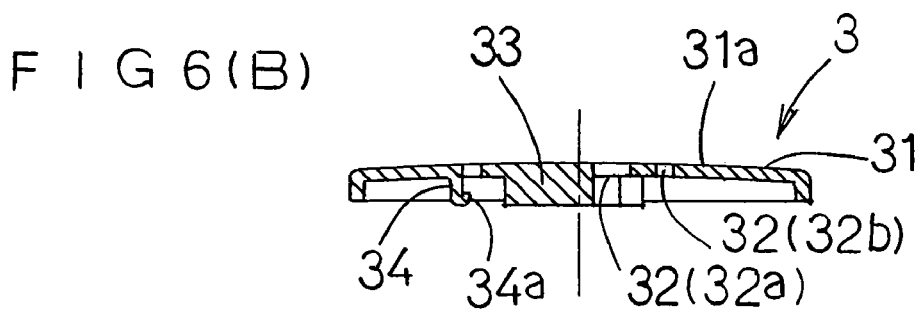
Figure 6C:
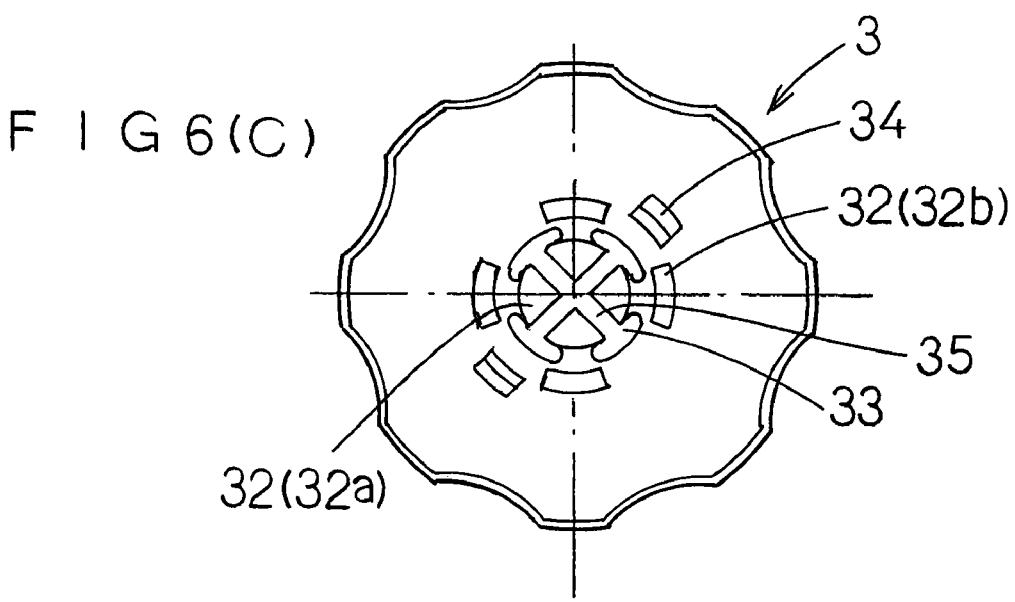

Pressing portion 33 is not limited to the configuration in this embodiment. For example, the pressing portions 33 may be disposed at four positions per 90° viewed from underneath with respect to the center of the upper surface 31 on the cover 3, while a cross-shaped connecting portion 35 viewed from underneath may be provided so as to connect the four pressing portions 33 as shown in FIG. 6(C). In this case, the peripheral edge of the valve body 4 is not entirely pressed because of some space between neighboring pressing portions 33. However, a state under negative pressure inside the compression bag B after air has been drawn out of the bag allows the valve body 4 of a soft material (as described later) to be drawn toward the deflation hole 22. Therefore, it does not cause any trouble concerning a functional perspective even the peripheral edge of the valve body 4 is partly pressed by the pressing portion 33. Further, in this case, the pressing portion 33 in pressing the valve body 4 is subject to being positioned on the outer peripheral side corresponding to the four areas of the deflation hole 22 divided by a cross-shaped part 27 of the stream vanes on the base 2. Since pressing the valve body 4 right outside of the above-mentioned areas of the deflation hole 22, the pressing portion 33 can reliably secure the valve body 4 in a closed state.

Figure 7A:
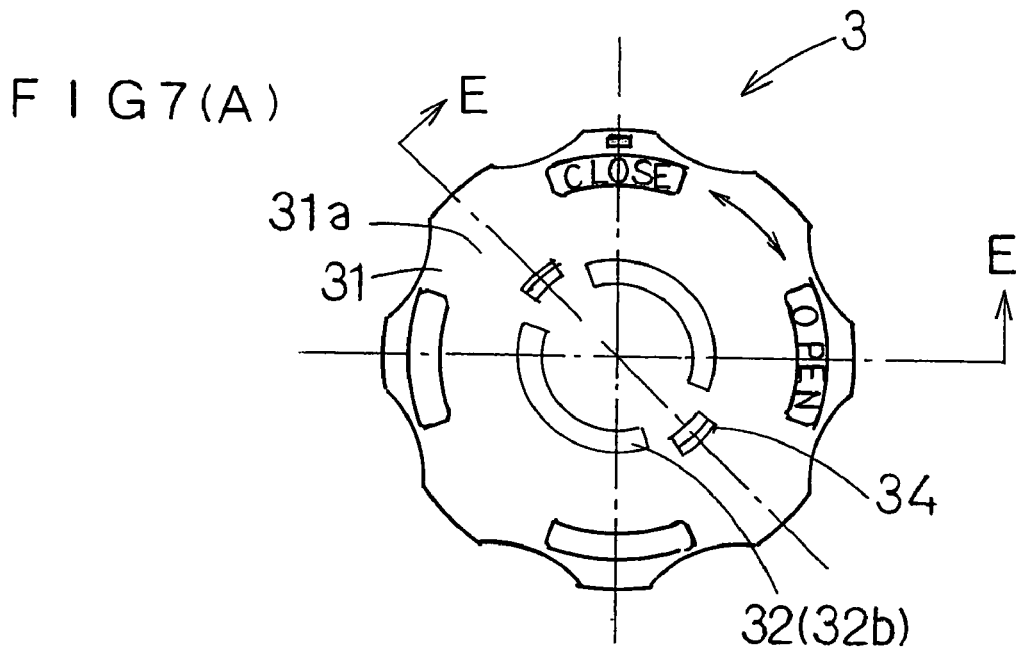
FIG. 7(A) is a plan view showing a further embodiment of the cover of deflation valve, FIG. 7(B) being a cross sectional view taken at cut line E-E in FIG. 7(A), and FIG. 7(C) being a bottom view of the embodiment.
Figure 7B:
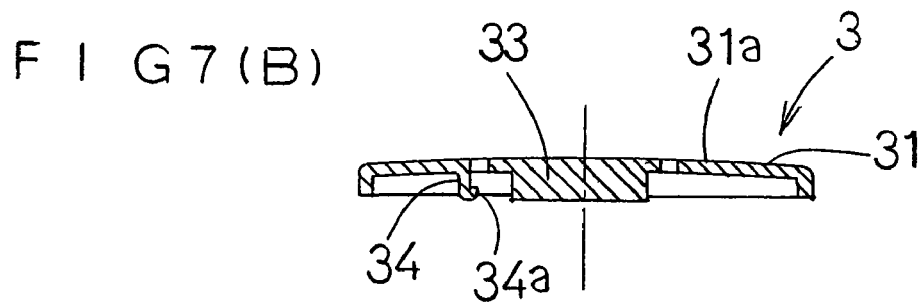
Figure 7C:
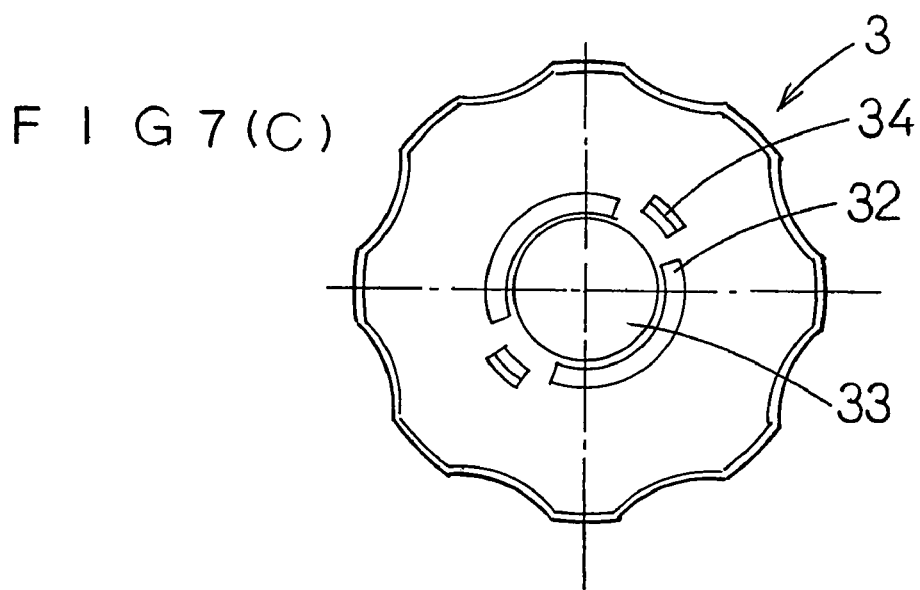
Figure 8A:
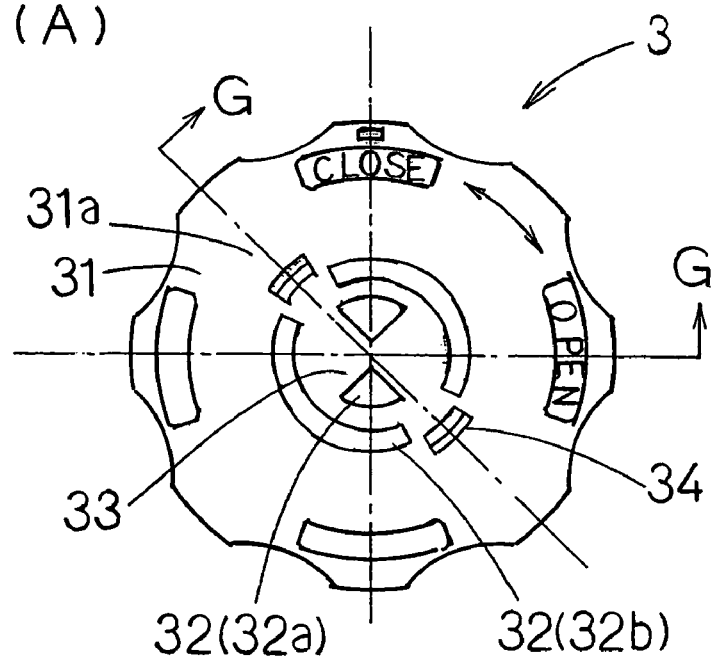
FIG. 8(A) is a plan view showing a further embodiment of the cover of deflation valve, FIG. 8(B) being a cross sectional view taken at cut line E-E in FIG. 8(A), and FIG. 8(C) being a bottom view of the embodiment.
Figure 8B:
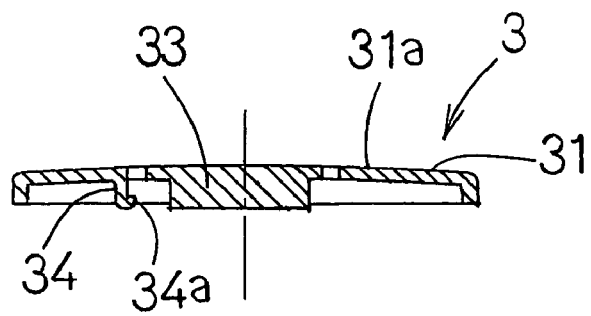
Figure 8C:
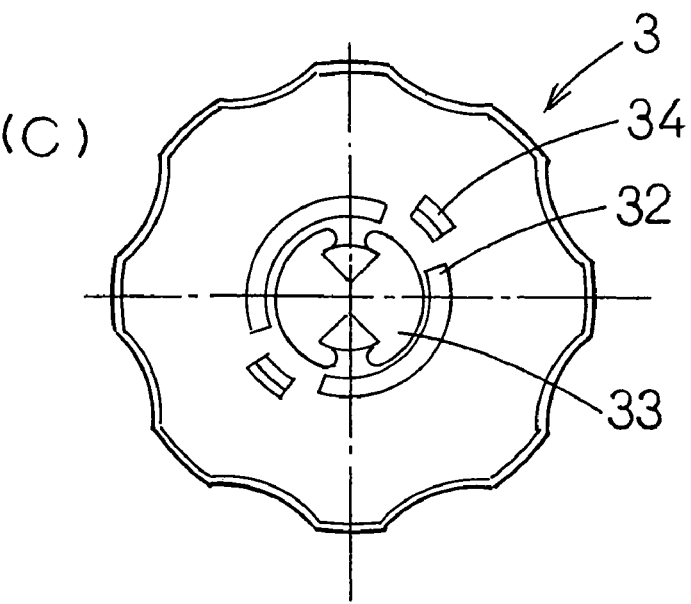

As shown in FIG. 7(C), the pressing portion 33 may be formed cylindrical so as to overlay the whole periphery of the valve body 4. As shown in FIG. 8(C), the pressing portion 33 may be shaped like a dumbbell with the center of the cover 3 narrowed so that the center of the cover 3 can be sandwiched by two holes of the center hole portion 32a. In the former case, the cover does not have a center hole 32a, and in the latter case, the center hole 32a is as half a size as the exemplified hole of the cover 3. In these cases, circumferential holes are continuously provided to keep where air in the bag is drawn out when discharging the air.

Figure 9:
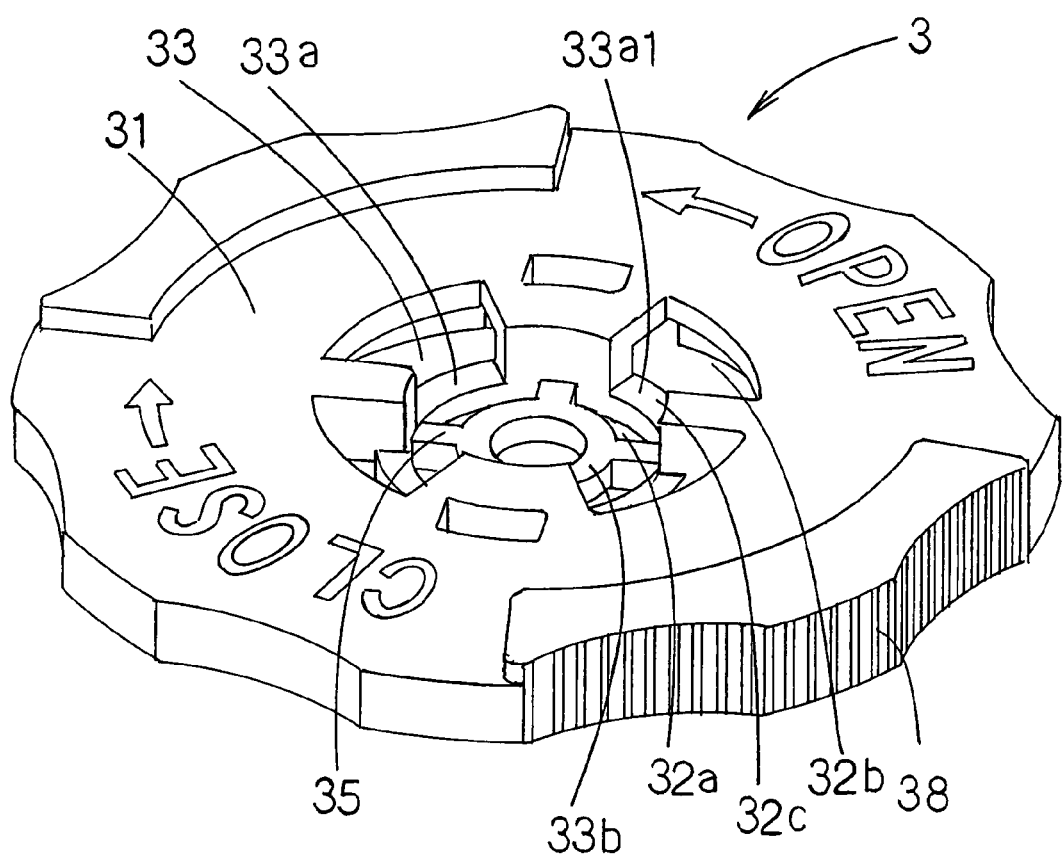
FIG. 9 is a perspective view showing the top of the cover of deflation valve in another embodiment.
Figure 10:
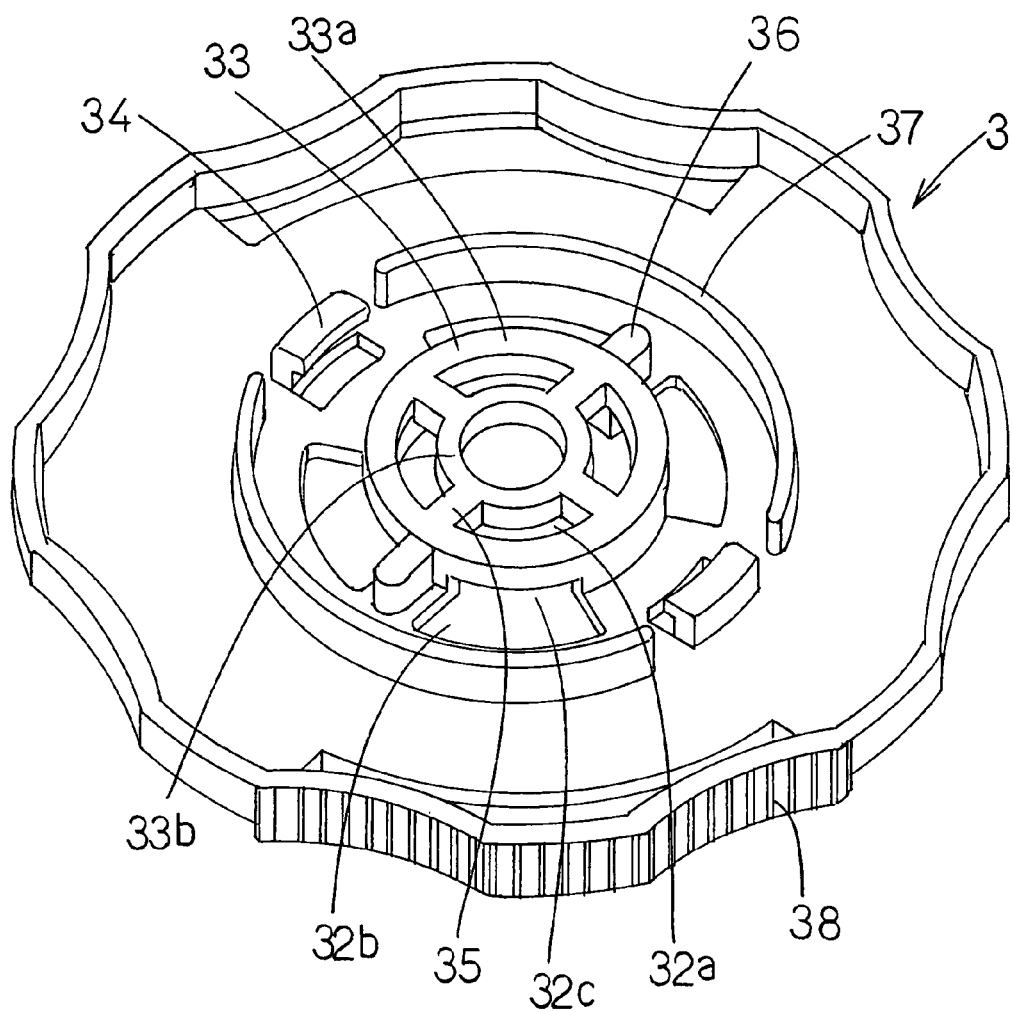
FIG. 10 is a perspective view showing the rear of the cover of deflation valve in another embodiment.

Other than the above-described configurations, a pressing portion 33 may be applied wherein the pressing portion has a pressing ring 33a such that the upper edge surface 33a1 thereof is positioned lower than the upper surface 31 of the cover 3 illustrated in FIGS. 9 and 10. In other words, the cover 3 in this type falls off in the center shown in FIG. 9. Otherwise, it may be recognized that the upper edge surface of the pressing portion 33 shown in FIG. 5(A) is placed lower, while the underside thereof remains in the same level of position. The pressing portion 33a in this case presses at least part of the peripheral edge of the valve body 4.

Further, a center hole 32a in the through hole 32 is provided in the pressing portion 33a in this case. In contrast, the circumferential holes 32b are provided on the periphery of the center hole 32a, specifically, on the outside of the pressing ring 33a viewed from the top.

The center hole 32a and circumferential holes 32b are positioned lower than the upper surface 31 of the cover 3, and a flight of space 32c that stretches above the pressing ring 33a is further provided, since the upper edge surface 33a1 of the pressing ring 33a is positioned lower than the upper surface 31 of the cover 3. In discharging air in the bag, the space 32c formed like the above allows the airflow through the deflation hole 22 of the base 2 shown in FIG. 15(C) to pass through the space 32c as well as the center hole 32a and circumferential holes 32b. Thus, the area for the airflow in the cover 3 can expand, thus quick discharge of the air is achieved.

In this embodiment, the pressing ring 33a is formed to allow a projection 41 of the valve body 4 to be in place, which is described later. Specifically, a connecting portion 35 on the center side of the pressing ring 33a is formed in a ring shape as illustrated, becoming a valve support portion 33b. The relation between this valve support portion 33b and the valve 4 will be described later.

Furthermore, as shown in FIG. 10, airflow prevention wall 37 is provided as it protrudes from the underside of the cover 3. This wall 37 is formed with a substantially same height and a common diameter to the hook 34. In this embodiment, there is some gap between the hook 34 and prevention wall 37, but both may be integrally formed without any gap. The prevention wall 37 may be formed outside the hook 34.

Figure 15A:
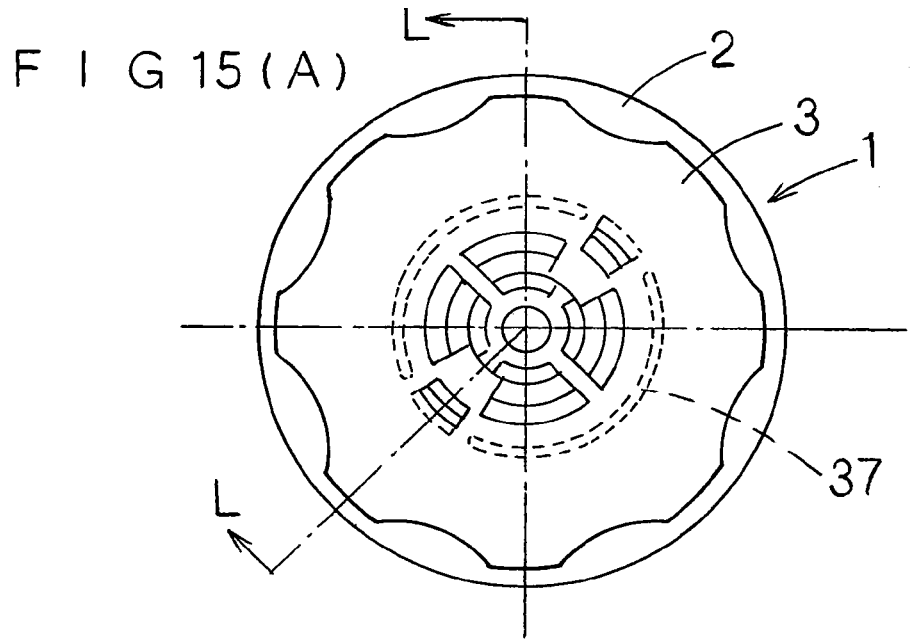
FIG. 15(A) is a plan view showing an opened state of deflation valve in another embodiment, FIG. 15(B) being a cross sectional view taken at cut line L-L in FIG. 15(A), and FIG. 15(C) being an enlarged cross sectional view of the principle part in FIG. 15(B), showing airflow.
Figure 15B:
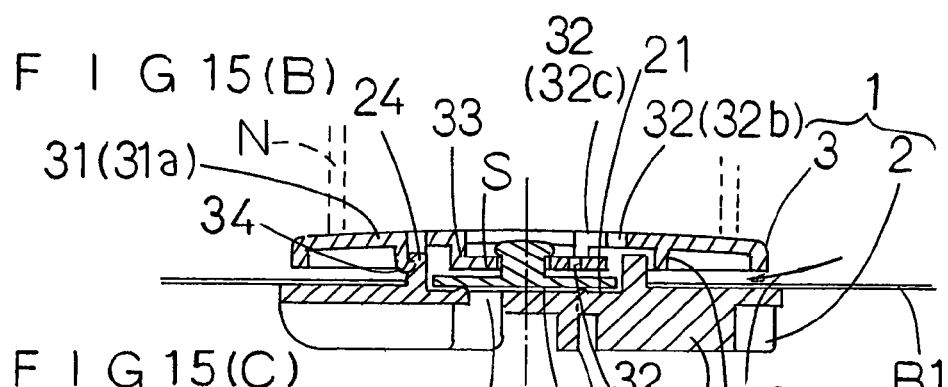
Figure 15C:
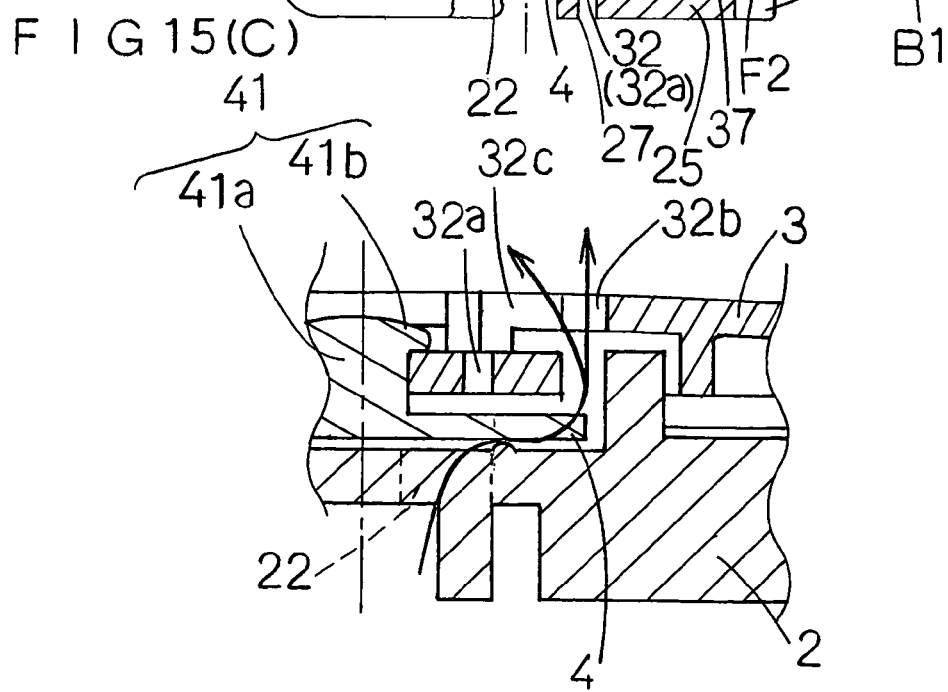

Hereupon, FIG. 15(B) shows a situation when the cover 3, which is loosened from the base 2 and positioned at the highest level, accepts a suction nozzle N of vacuum cleaner at the contact portion 31a in order to draw air out of the bag through the deflation hole 22. At this moment, besides the present airflow through the deflation hole 22, an adverse airflow F2 occurs and passes in between the periphery of the cover 3 and bag sheet B1, reaching to a through hole 32 beyond the sidewall 24, causing to obstruct the present airflow through the deflation hole 22. However, the adverse airflow F2 can be blocked since the airflow prevention wall 37 is formed outside the sidewall 24 in a manner to protrude downward from the underside of the cover 3. Air can be drawn totally through the inherent deflation hole 22, thus quick discharge of the air is achieved.

When the airflow F2 is completely blocked by the prevention wall 37, a vacuum cleaner will continue to suck even after air inside the bag has been drawn. This would damage the motor of the vacuum cleaner due to overload, and could lead to an accidental fire at the very worst. Consequently, it is preferable that the airflow prevention wall 37 be configured to provide a gap between the attachment plate 23 and the wall 37 when the cover 3 is loosened such that the airflow F2 is not completely blocked.

The outer periphery of the cover 3 may be changed into various shapes. For example, a series of thin convexity 38 for a firm grip may be provided, as shown in FIGS. 9 and 10.

A valve body 4 is disposed in a valve housing chamber S enclosed by the diaphragm 21 of the base 2 and the cover 3. In details, the chamber S is defined by the sidewall 24, diaphragm 21, and the lower edge of the pressing portion 33 of the cover 3. Unlike an invention described in Patent Reference 1, the valve body 4 is neither secured to the base 2 and the cover 3 nor pressed by any elastic member, but is disposed inside the chamber S in a free state. The valve body 4 is movable upward and downward inside the chamber S when the cover 3 is loosened as described above. The size of the valve assembly protruding from the compression bag B can be reduced for the portion of an elastic member or the like when the compression bag B is equipped with the deflation valve 1.

Shape of the valve may be variously applicable such as a round or polygonal one in a top view as long as the valve is movable upward and downward inside the chamber S when the cover 3 is loosened. Further, the valve may substantially match the dimension of the inner periphery of the sidewall 24 on the base 2, thus not moving horizontally, or may be shaped to be horizontally movable in the chamber S. In the latter case, the valve body 4 needs to overlay the whole area of the deflation hole 22 and leave the port 22 closed when being displaced horizontally.

The shape of the valve body 4 in this embodiment is oval. The dimensions are 24 mm in the major axis and 20 mm in the minor axis.

The vertical dimension of the valve housing chamber S is formed at least smaller than the minimum dimension (a minor axis of the oval in this embodiment) crossing the center of the valve body 4 in the horizontal direction. Owing to this, the valve body 4 does not flip in the chamber S and functions reliably. In this embodiment the vertical dimension of the valve housing chamber S is supposed to be 6 mm or less, which is larger compared to the thickness of the valve body 4. Consequently, it is safe for a vacuum cleaner to suck the bag without any fear of overloading.

After the suction nozzle N of vacuum cleaner contacts the contact portion 31a on the cover 3 and sucks the bag, the valve body 4, which is made of a soft resin such as rubber, is drawn toward the cover 3 and away from the deflation hole 22. A rubber sheet used for the valve body 4 in this embodiment is 0.6 mm thick. As described above, since being disposed inside the valve housing chamber S in a free state, the valve body 4 can move without any restriction and instantly respond to said suction, thus quick discharge of the air is achieved. Difference of pressure, namely, negative pressure inside the compression bag B and positive pressure outside the same, occurs after the suction, and the valve body 4 is quickly attached to the deflation hole 22. Therefore, the compression bag B keeps its inside airtight even when the cover 3 is not tightened to the base 2 as shown in FIG. 13(B). In addition, when the cover 3 is tightened, the pressing portion 33 of the cover 3 presses the valve body 4 downward as shown in FIG. 12(B), and the deflation hole 22 can be kept sealed.

As shown in FIGS. 4(A) and 4(B), a set of guide portions 28 may be provided along at least part of the inner periphery of the sidewall 24. The guides 28 formed upward from the diaphragm 21 become the limit of the valve body 4 to the horizontal movement in the inner periphery of the guide portions. In other words, the valve housing chamber S in this embodiment is defined by the guides 28 along with the sidewall 24, diaphragm 21, and the lower edge of the pressing portion 33.

Two guides 28 shown in FIGS. 4(A) and 4(B) are provided one by one per 180° with respect to the center of the attachment plate 23 in a top view. Between the guides 28 is formed a space 29 along the inner peripheral surface of the sidewall 24. In the space 29, airflow passing through the deflation hole 22 with the valve body 4 away from the hole 22 as shown in FIG. 13(B) can be bound to the circumferential holes 32b in the cover 3. This arrangement achieves smoother deflation than one without any space 29.

The upper surface of the guides 28 shown in FIGS. 4(A) and 4(B) is made flat, but may be made slanted. The cover may have a member touching the upper surface. Further, on the upper surface or inner peripheral surface of the guides 28 may be provided the above-described click protrusions 24b. Furthermore, various changes may be made such that three or more guides 28 are provided, thus increasing the number of the spaces 29 in proportion to the number of the guide portions 28.

Figure 11:
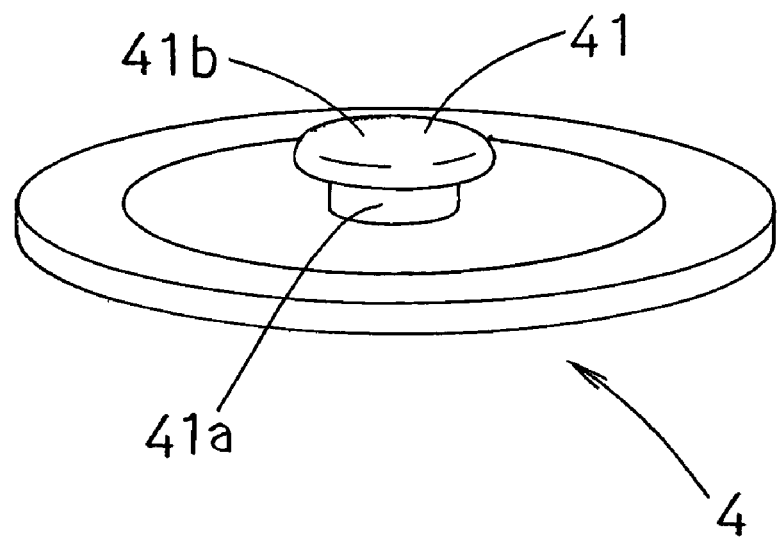
FIGS. 11(A) and 11(B) are perspective views showing the top of deflation valve in another embodiment.
Figure 11:
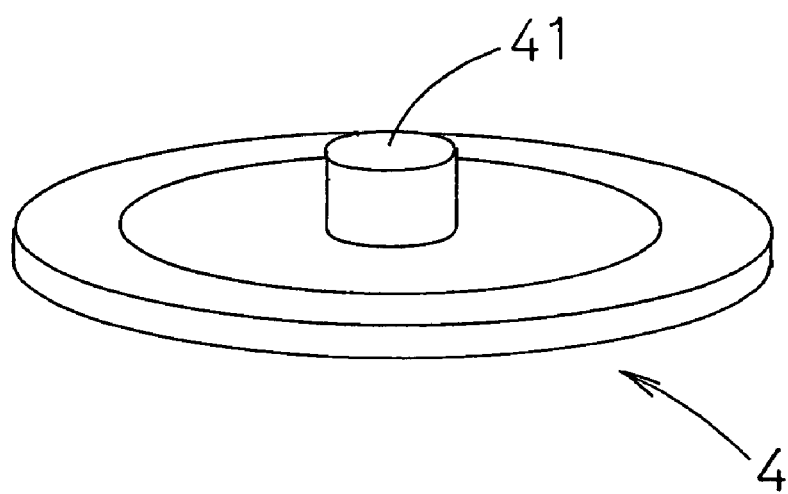

The above-described valve body 4 shapes like a flat plate, however, it may include a projection 41 jutting out upward as shown in FIG. 11. The projection 41 is arranged so as to be movable upward and downward through the valve support portion 33b provided on the pressing ring 33a of the cover 3.

Specifically, the projection 41 provided at the center of the valve body 4 as shown in FIG. 11(A) has a middle part 41a, which is round in cross section. The diameter of the middle part 41b is slightly smaller than the inner diameter of the valve support portion 33b formed circular likewise. The vertical dimension thereof is larger than the dimension of the valve support portion 33b. At the edge portion 41b of the protrusion 41 is formed larger than the inner diameter of the valve support portion 33b. Consequently, the valve body 4 in place in the valve support portion 33b is movable upward and downward in the range of the vertical dimension of the middle portion 41a without separating from the valve support portion 33b.

Providing the valve body 4 in part of the cover 3 in this manner keeps the valve body 4 horizontally in place and functions the valve body 4 stably.

It is applicable for the protrusion 41 to be provided in a uniform diameter without having the edge 41b with a larger diameter as shown in FIG. 11(B). Even in this case, a vertical range within which the valve body 4 moves is limited to the vertical dimension of the valve housing chamber S, namely, the distance between the diaphragm 21 and the lower edge of the pressing portion 33.

Although a valve body 4 provided with such protrusion 41 is used in combination with a cover 3 having a ring-shaped valve support portion 33b shown in FIGS. 9 and 10, the above-mentioned flat-type valve body 4 may be used in combination with the cover 3 having said valve support portion 33b.

A deflation valve 1 of the above-described structure is used to be provided to a compression bag B, which is made of soft resin bag sheets B1 adhered together by means of, for example, heat sealing, and the inside of which is made a hermetically closable space. The compression bag B has an opening B2 for an item to be stored, and a fastener B3 that can close the bag airtight.

In use of the compression bag B, the item is stored in the bag before the fastener B3 is closed, then the cover 3 is loosened from the base 2. Suction nozzle N of vacuum cleaner contacts the contact portion 31a on the cover 3 to draw the air inside the bag out through an opening for deflation, as shown in FIG. 13(B). Since the valve body 4 and the deflation opening 22 are sealed airtight owing to the difference of pressure between the inside and outside of the bag occurring after the deflation, the deflated state can be kept. In order to keep such a deflated state more securely, the cover 3 is engaged tight onto the base 2, while the pressing portion 33 of the cover 3 presses the valve body 4 onto the deflation opening 22 as shown in FIG. 12(B). This will be able to keep the deflated state for a long period of time.

As shown in FIG. 16, an indicating sign 39 such as arrow is provided on the upper surface 31 of the cover 3 of the deflation valve 1, while an open-state mark B4 and a closed-state mark B5 that correspond to the sign 39 to show the status of the valve 1 are provided on the sheet B1. When the sign 39 points to the open-state mark B4, the valve 1 stays open. When the sign 39 points to the closed-state mark B5, the valve stays closed. Regarding showing of the sign 39, open-state mark B4, and closed-state mark B5, they may be provided in the known ways one having ordinary skill in the art employ.

The present invention has the following excellent effects.

As for a deflation valve for a compression bag in an aspect according to claim 1, the valve housing chamber S is defined by the sidewall 24, diaphragm 21, and the lower edge of the pressing portion 33 of the cover 3, while the valve body 4 is neither secured to the base 2 and the cover 3 nor pressed by any elastic member, but is disposed inside the valve housing chamber S in a free state. Consequently, the size of the valve assembly protruding from the compression bag can be reduced for the portion of an elastic member or the like, and the valve body 4 can instantly respond to the sucking operation by a vacuum source, thus quick discharge of the air is achieved.

In addition to the effects described above, as for a deflation valve for a compression bag in an aspect according to claim 2, the vertical dimension of the valve housing chamber S is formed at least smaller than the minimum dimension crossing the center of the valve body 4 in the horizontal direction. Consequently, the valve body 4 does not flip in the chamber S and functions reliably.

In addition to the effects of claims 1 and 2, as for a deflation valve for a compression bag in an aspect according to claim 3, the valve is comprised of at most the base 2, cover 3 and valve body 4, and its structure is relatively simple.

In addition to the effects of claims 1 and 2, as for a deflation valve for a compression bag in an aspect according to claim 4, airflow prevention wall 37 protruding from the underside of the cover 3 is provided and able to block the adverse airflow F2 passing from the periphery of the cover 3 and reaching to the through hole 32 beyond the sidewall 24. Consequently, air can be drawn totally through the inherent deflation hall 22, thus quick discharge of the air is achieved.

In addition to the effects of claims 1 and 2, as for a deflation valve for a compression bag in an aspect according to claim 5, the pressing ring 33a in which the upper edge surface 33a1 thereof is positioned lower than the upper surface 31 of the cover 3 is provided, and the center hole 32a and circumferential holes. 32b are positioned lower than the upper surface 31 of the cover 3, and a flight of space 32c that stretches above the pressing ring 33a is further provided. Consequently,; airflow can also pass through the space 32c as well as the center hole 32a and circumferential holes 32b, and the area for airflow in the cover 3 can expand, thus quick discharge of the air achieved.

In addition to the effect of claim 5, as for a deflation valve for a compression bag in an aspect according to claim 6, the projection 41 of the valve body 4 is arranged so as to be movable upward and downward through the valve support portion 33b of the cover 3. Consequently, the valve body 4 is kept horizontally in place and functions stably.

As for a compression bag in an aspect according to claim 7, the bag has the effects of any of an aspects of claims 1 to 6.

What is claimed is:

1. A deflation valve for a compression bag comprising:
   a base (2) having a set of slots (24a) and serving as a deflation opening of a compression bag (B) after being fixed to a hole provided on the compression bag (B);
   a cover (3) attached to the top of the base (2) by engagement screwed into the slots (24a); and
   a valve body (4) formed separately from the base (2) and the cover (3);
   the base (2) being formed with a diaphragm (21) that closes the inside of the compression bag (B) from the outside thereof, the diaphragm (21) being provided with a deflation hole (22) that communicates the inside and outside of the compression bag (B);
   the cover (3) having a contact portion (31a) on its upper surface to be contacted with a suction nozzle (N) of vacuum cleaner as a vacuum source, the contact portion (31a) being provided with a through hole (32) in the area the suction nozzle (N) contacts and encircles, the through hole leading to the inside of the cover (3);
   the valve body (4) being disposed in a valve housing chamber (S) enclosed by the diaphragm (21) of the base (2) and the cover (3), and being able to close the deflation hole (22) from the upper side by being drawn toward the hole under negative pressure inside the compression bag (B), the valve body being movable away from the deflation hole (22) by suction of the vacuum source when the cover (3) is loosened and moves up, then keeping the deflation hole (22) sealed when the cover (3) is tightened and moves down,
   wherein a set of the slots (24a) are provided on a sidewall (24) that is formed in a manner to protrude upward on the base (2), and a pressing portion (33) is formed on the underside of the cover (3) in order to press the valve body (4) with the engagement of the cover (3), and
   the valve housing chamber (S) is defined by the sidewall (24), the diaphragm (21), and the lower edge of the pressing portion (33) of the cover (3), while the valve body (4) is neither secured to the base (2) and the cover (3) nor pressed by any elastic member, but is disposed inside the valve housing chamber (S) in a free state,
   whereby the valve body (4) is movable upward and downward inside the valve housing chamber (S) when the cover (3) is loosened, and can entirely overlay the deflation hole (22) despite the horizontal movement of the valve body (4).

2. The deflation valve for a compression bag according to claim 1, wherein the vertical dimension of the valve housing chamber S is formed at least smaller than the minimum dimension crossing the center of the valve body 4 in the horizontal direction when the cover (3) is loosened.

3. The deflation valve for a compression bag according to claim 1, wherein the valve is comprised of at most the base (2), the cover (3), and the valve body (4).

4. The deflation valve for a compression bag according to claim 1, wherein airflow interference wall (37) protruding from the underside of the cover (3) is provided outside the through hole (32) as well as outside the sidewall (24) of the base (2) with the cover (3) attached thereto in a top view.

5. The deflation valve for a compression bag according to claim 1, wherein the pressing portion (33) of the cover (3) is configured such that:
   a pressing ring (33a) in which an upper edge surface (33a1) is positioned lower than the upper surface (31) of the cover (3) is provided, and
   the through hole (32) is comprised of a center hole (32a) provided in the pressing ring (33a) and circumferential holes (32b) provided outside the pressing ring (33a) in a top view, the center hole (32a) and circumferential holes (32b) being positioned lower than the upper surface (31) of the cover (3), and
   a flight of space (32c) that stretches above the pressing ring (33a) is further provided.

6. The deflation valve for a compression bag according to claim 5, wherein the valve body (4) includes a projection (41) jutting out upward, and the pressing ring (33a) of the cover (3) is provided with a valve support portion (33b), wherein the projection (41) is arranged so as to be movable upward and downward through the valve support portion (33b).

7. A compression bag having a sealable space thereinside by adhering soft resin bag sheets (B1), wherein the bag sheet (B1) is equipped with a deflation valve (1) for a compression bag in claim 1, and air in the space is drawn out of the bag through the deflation hole (22), whereby the deflated state can be kept.

* * * * *